United States Patent Office 2,766,290
Patented Oct. 9, 1956

2,766,290

CONVERSION OF HYDROXY VITAMIN A ACETAL TO VITAMIN A ALDEHYDE

George L. Fletcher, Rochester, N. Y., assignor to Eastman Kodak Company, Rochester, N. Y., a corporation of New Jersey No Drawing. Application April 22, 1954,
Serial No. 425,030

9 Claims. (Cl. 260—598)

This invention relates to methods of making vitamin A aldehyde and is particularly concerned with the conversion of a hydroxy vitamin A acetal to vitamin A aldehyde.

Vitamin A aldehyde is a valuable compound in the manufacture of synthetic vitamin A, since it possesses high vitamin A activity itself and also is readily reduced to vitamin A alcohol by well-known methods such as the Meerwein-Ponndorf reduction with aluminum alkoxide and alcohol or the reduction with an ether-soluble metal hydride or similar method of reducing olefinic aldehydes to the corresponding alcohol. Vitamin A alcohol is, of course, readily esterified by known methods to form the acetate, palmitate or similar well-known ester, vitamin A usually being sold commercially in the ester form.

In the synthesis of vitamin A, either or both of the Reformatsky and Grignard type reactions are useful in building up the requisite skeletal molecular structure of vitamin A. Both reactions yield a hydroxy compound, however, and dehydration is necessary to attain vitamin A-active material. In the case of the polyenes of the vitamin A series, dehydration usually results in a substantial amount of concomitant isomerization whereby a large proportion of product is an isomeric compound rather than the desired vitamin A.

Among the potential vitamin A intermediates, the hydroxy polyene acetals possessing the carbon skeleton of vitamin A and hereinafter referred to for brevity as hydroxy vitamin A acetals, are very valuable intermediates since they can be prepared in good yield by a variety of methods. Such hydroxy vitamin A acetals include both the monohydroxy vitamin A acetals and the dihydroxy vitamin A acetals (referred to for convenience as vitamin A diol acetals), both cyclic and open acetals, and compounds having an unsaturated structure isomeric to the α,β-unsaturated completely conjugated vitamin A structure.

It is accordingly an object of this invention to provide a new method of making vitamin A aldehyde.

It is a further object of this invention to provide an effective method of converting hydroxy polyene acetals having the carbon skeleton of the vitamin A molecule to vitamin A aldehyde in high yield.

Another object of the invention is to convert hydroxy vitamin A acetals to vitamin A aldehyde without objectionable yield losses due to isomerization.

Another object of the invention is to provide a method of converting hydroxy vitamin A acetals to vitamin A aldehyde in a single reaction.

Another object of the invention is to dehydrate and hydrolyze hydroxy vitamin A acetals to vitamin A aldehyde in a single reaction step.

Another object of the invention is to facilitate vitamin A syntheses involving a Reformatsky or Grignard reaction which produces a hydroxy vitamin A acetal.

Another object of the invention is to dehydrate and hydrolyze vitamin A diol acetal to vitamin A aldehyde in good yield.

Another object of the invention is to provide a new method which minimizes the yield losses normally attendant to converting a hydroxy vitamin A compound to vitamin A-active material.

Another object of the invention is to convert vitamin A 3,7-diol acetal to vitamin A aldehyde in a single reaction step.

Another object of the invention is to provide a method which accomplishes in a single step a conversion which normally would involve a plurality of steps with an attendant lowered yield due to multiple reactions, isolations and handlings.

Other objects will be apparent from the description and claims which follow.

These and other objects are attained by means of this invention as described more fully hereinafter with reference to certain preferred embodiments, the method embodying the invention comprising treating a hydroxy polyene acetal having the carbon skeleton of vitamin A with a water-hydrolyzable halogenated hydrocarbon and thereby, in a single reaction mixture, converting such hydroxy vitamin A acetal to vitamin A aldehyde in a single step.

The hydroxy polyene acetals having the carbon skeleton of vitamin A, and herein called hydroxy vitamin A acetals, include both monohydroxy and dihydroxy acetals and both cyclic and open acetals, the dialkyl acetals being conveniently employed. Typical vitamin A diol acetals include the 3,7-diol of the formula

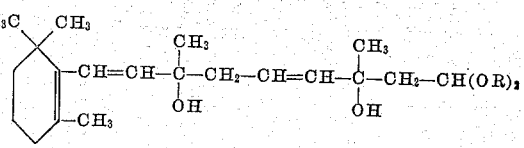

COMPOUND I wherein R is an alkyl group in an open acetal for purposes of illustration; the 3,6 diol of the formula

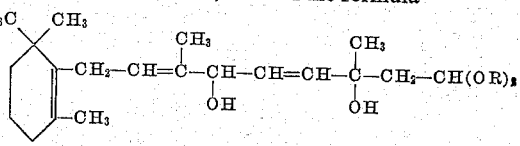

COMPOUND II and the 3,5 diol of the formula

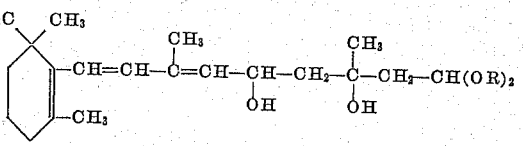

COMPOUND III

Typical monohydroxy vitamin A acetals include the 3-hydroxy compound of the formula

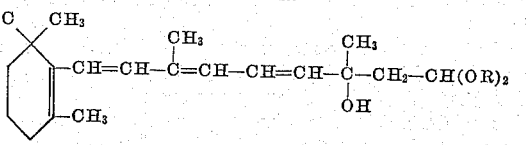

COMPOUND IV or its 3-hydroxy desmotropic isomer of the formula

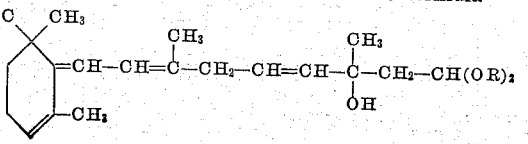

COMPOUND V as well as the 7-hydroxy compound of the formula

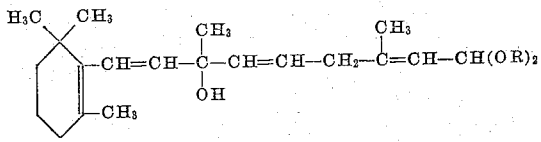

COMPOUND VI and similar hydroxy vitamin A acetals. Isomers of these hydroxy vitamin A acetals are similarly converted to isomers of vitamin A aldehyde and are included in the invention as defined herein.

The hydroxy vitamin A acetals can be prepared in a number of ways. Thus, for example, Compound I can be prepared by condensing β-ionone with propargyl bromide in the presence of zinc to form a propinyl carbinol, condensing the propinyl carbinol with a dialkyl acetal of β-ketobutyraldehyde by means of a Grignard reaction and subjecting the resulting condensation product to partial hydrogenation with a molecular equivalent of hydrogen in the presence of a palladium catalyst to reduce the acetylenic linkage to an olefinic linkage and thereby obtain Compound I.

Compound II is readily prepared by reacting a dialkyl acetal of β-ketobutyraldehyde with sodium acetylide in liquid ammonia, subjecting the resulting product to a Grignard reaction with the C14-aldehyde, 4-(2,6,6-trimethyl cyclohexen-1-yl)-2-methyl-but-2-ene-1-al, and partially hydrogenating the condensation product thereby obtained to form the 3,6-diol, Compound II.

Compound III can be prepared by reacting β-ionylidene acetaldehyde with methyl magnesium bromide, oxidizing the resulting carbinol to a carbonyl compound and condensing the carbonyl compound with 4,4-dialkoxy-2-butanone by means of sodium methylate, and reducing the hydroxy keto vitamin A acetal thus obtained to Compound III. This method is cumbersome, however, and β-ionylidene acetaldehyde is preferably employed for making Compound IV. Compound IV is prepared by reacting β-ionylidene acetaldehyde with a dialkyl acetal of β-ketobutyraldehyde in the presence of sodium methylate and reacting the resulting product with methyl magnesium bromide.

Compound V can be prepared by a process similar to that employed for preparing Compound I. β-ionone is condensed with propargyl bromide in the presence of zinc to form an ethinyl carbinol which is then dehydrated with hydrochloric acid in methyl alcohol. A substantial proportion of the dehydration occurs by splitting out of a ring hydrogen to give cyclohex-2-ene-1-ylidenic compound which is thereafter carried through the process employed with Compound I, thus giving Compound V as a product. That portion of the propinyl carbinol which dehydrates in the side chain can be carried through the same process to give Compound IV. A mixture of Compound IV and Compound V can also be prepared by treating Compound I with thionyl chloride and pyridine whereby the 7-hydroxy group splits off leaving the 3-hydroxy group largely intact.

Compound VI can be prepared by condensing propargyl bromide with a dialkyl acetal of β-ketobutyraldehyde in the presence of zinc, dehydrating the resulting condensation product, subjecting the dehydrated product to a Grignard reaction with β-ionone, and partially hydrogenating the acetylenic linkage to give Compound VI.

The hydroxy vitamin A acetals are largely devoid of vitamin A biological activity but possess the requisite skeletal carbon structure. In order to obtain vitamin A-active material, it is necessary to dehydrate hydroxy vitamin A compounds which usually causes concomitant formation of a major proportion of a cyclohex-2-ene-1-ylidenic isomer of vitamin A. In the process embodying this invention, however, dehydration of the hydroxy compounds and hydrolysis of the acetal group is effected in a single reaction step to give vitamin A aldehyde or an isomer thereof if an isomeric hydroxy acetal is used. The exact mechanism by which the conversion occurs is not known since the conversion takes place without isolation of any intermediate products.

Employing Compound I for purposes of illustration, the process embodying the present invention can be illustrated graphically as follows:

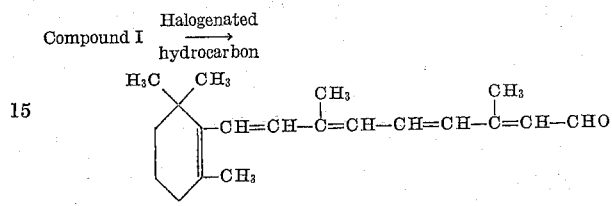

The conversion of other hydroxy vitamin A acetals to vitamin A aldehyde proceeds in similar fashion in a single reaction mixture employing the process embodying the present invention.

In practicing this invention, the hydroxy vitamin A acetal is treated with a water-hydrolyzable halogenated hydrocarbon preferably in a homogeneous system and preferably at an elevated temperature below the decomposition temperature of the hydroxy vitamin A acetal. Although the exact reason for the conversion is not understood, it appears to be a function of the controlled hydrolysis of the halogenated hydrocarbon by water evolved from the dehydration. The halogenated hydrocarbon, if a liquid, can also serve as the reaction vehicle if desired and the use of large amounts of the halogenated hydrocarbon is desirable in many cases in order to facilitate the course of the conversion. If desired, however, an inert solvent such as methyl ethyl ketone, benzene, diethyl ketone, acetone, ether, petroleum ether, hexane, xylene or the like can be used as the reaction vehicle and amounts of halogenated hydrocarbon as low as about 10% by weight based on the weight of the reaction mixture can be used.

The reaction proceeds readily in a homogeneous system, and it is therefore desirable to limit the amount of water in the reaction to an amount which is insufficient to form a two phase system. Larger amounts of water can be present, however, particularly if the reaction mixture is agitated sufficiently to give effectively a homogeneous system. When the halogenated hydrocarbon is itself used as the reaction medium, the water content is preferably maintained below about 10% of the total weight of the mixture and preferably below about 5%. When another solvent, other than the halogenated hydrocarbon, is used, however, the water tolerance of the system can be greatly increased depending upon the miscibility characteristics of the components. Since minor amounts of water are not objectionable in any of the embodiments of the invention, it is not necessary to employ anhydrous reactants. Even though the conversion appears to depend at least in part on hydrolysis of the halogenated hydrocarbon, water need not be added to the initial reaction mixture since the conversion appears to be initiated by traces of water present in the reactants or by a partial dehydration of the hydroxy vitamin A acetal by heat alone.

The conversion is desirably effected at elevated temperatures in order to shorten the reaction time although it proceeds slowly even at room temperature. For optimum results, of course, the temperature should be maintained below the decomposition temperature of the hydroxy vitamin A acetal, and is desirably in the range of about 50–180° C. although higher temperatures such as 200° C. or even higher can be used. When the reaction temperature is above the reflux temperature of the reaction vehicle, the conversion is carried out in a closed reaction in order to avoid loss of reactants and to permit the attainment of the desired temperature. Unexpectedly, the conversion of this invention proceeds in good yield with little or no unwanted isomerization to a β,γ-unsaturated isomer of low potency.

In practicing the invention any of the water-hydrolyzable solid and liquid halogenated hydrocarbons can be used, best results being obtained with the halogenated aliphatic hydrocarbons. The hydrocarbon can be a monohalogenated, dihalogenated, trihalogenated or tetrahalogenated hydrocarbon, and the halogen substituents can be any one or more of the well-known halogens such as chlorine, bromine or iodine. The fluorinated hydrocarbons are operable but less desirably employed due to handling difficulties. Thus typical halogenated hydrocarbons which are suitably employed include but are not limited to such materials as methyl bromide, methyl chloride, methyl iodide, chloroform, carbon tetrachloride, ethyl chloride, dichloroethane, ethyl bromide, ethyl iodide, trichloroethane, dibromoethane, tetrachloroethane, tetrabromoethane, allyl chloride, allyl bromide, propyl chloride, allyl iodide, propyl bromide, propyl iodide, isopropyl chloride, isopropyl iodide, isopropyl bromide, t-butyl chloride, n-butyl chloride, n-butyl iodide, n-butyl bromide, t-butyl iodide, t-butyl bromide, dichloropropane, tetrachloropropane, n-butyl dichloride, amyl chloride, amyl bromide, amyl iodide, hexyl chloride, heptyl chloride, hexyl bromide, heptyl bromide, dichlorohexane, trichlorohexane, tetrachlorohexane, and similar well-known water-hydrolyzable halogenated hydrocarbons. The halogenated hydrocarbon can amount to as little as about 10% of the weight of hydroxy vitamin A acetal or two, three or more times the weight of hydroxy vitamin A acetal being converted to vitamin A aldehyde as desired.

The reaction time will, of course, depend upon the other reaction conditions such as the reaction temperature, the kind and concentration of halogenated hydrocarbon, and similar variable factors, and can vary anywhere from a few minutes to several hours or longer. When the reaction has been completed, both dehydration and hydrolysis have been effected concomitantly without attendant isomerization, and vitamin A aldehyde is produced having high vitamin A activity as compared to little or no activity for the hydroxy vitamin A acetal. The dihydroxy vitamin A acetals dehydrate completely and as readily as do the monohydroxy vitamin A acetals, and the cleavage of the acetal group to an aldehyde group proceeds without the formation of ethers as by-products.

Thus, by means of this invention, the synthesis of vitamin A is greatly facilitated because the conversion embodying this invention is carried out in a single operative step with no intermediate isolations or purifications to complicate the synthesis and reduce the yield. The invention is illustrated by the following examples of certain preferred embodiments thereof. It will be understood, however, that the examples are included merely to illustrate the best mode of practicing the invention and are not intended to limit the scope of the invention unless otherwise specifically indicated.

Example 1

A solution of 1.017 g. of 83.3% pure vitamin A 3,7-diol dimethyl acetal in 20 g. of chloroform was sealed in a Carius combustion tube and heated in an oil bath at 120° C. for 90 minutes. The tube was then opened and the reaction mixture rinsed out with ethyl ether. The resulting ethyl ether-chloroform solution was washed with dilute hydrochloric acid solution and then with water until the washes were neutral. The solvent layer was evaporated off under reduced pressure leaving a residue of 0.848 g. of vitamin A aldehyde concentrate which showed $$E_{1cm}^{1\%} (370\ m\mu) = 761$$

The yield of vitamin A aldehyde in the single step conversion was 69.7%.

Example 2

A solution of 1.0259 g. of 83.3% pure vitamin A, 3,7-diol dimethyl acetal in 20 g. of chloroform was heated in a sealed tube at 120° C. for 60 minutes. The product was worked up as in the preceding example to give 0.727 g. of vitamin A aldehyde concentrate having $$E_{1cm}^{1\%} (370\ m\mu) = 846, \text{ a yield of } 66\%$$

Example 3

As has been described, any of the water-hydrolyzable halogenated hydrocarbons can be used in practicing the invention, whether partially or fully halogenated. Thus a solution of 0.04 g. of 83.3% pure vitamin A 3,7-diol dimethyl acetal in 1 ml. of carbon tetrachloride was heated at 120° C. for one hour in a sealed tube. After removal of the carbon tetrachloride, 0.0325 g. of vitamin A aldehyde concentrate was obtained representing a yield of 71.3%.

Example 4

In like manner, the single step conversion of the invention can be effected with alkyl monohalides with excellent results. A solution of 0.884 g. of 83% pure vitamin A 3,7-diol dimethyl acetal in 50 g. of N-butyl chloride was heated at 115° C. for 1 hour to produce 0.625 g. of vitamin A aldehyde concentrate in an 80% yield. As is evident from this example, the amount of halogenated hydrocarbon can be varied over wide limits from amounts of approximately equal the weight of the hydroxy vitamin A acetal to as much as fifty or one hundred or more times the weight of hydroxy vitamin A acetal.

Example 5

In practicing the invention, it is not necessary that the halogen atoms be on the same carbon atom of the hydrocarbon. Thus, 1.201 g. of 83.3% pure vitamin A 3,7-diol dimethyl acetal was dissolved in 50 ml. of 1,3-dichloropropane, and the resulting solution was heated in a sealed tube at 115° C. for 60 minutes. The product was worked up to give 0.785 g. of vitamin A aldehyde concentrate representing a yield of 64%.

Example 6

Although it is desirable to limit the amount of water present so that the reaction proceeds in a single phase system without the use of agitation to ensure homogeneity, larger amounts of water can be present than that present in the reactants themselves. Thus, 1.0 g. of the hydroxy vitamin A acetal, vitamin A 3,7-diol dimethyl acetal, was dissolved in 100 g. of chloroform which was saturated with water, and the solution was heated for 90 minutes at 120° C. to give a 48% conversion to vitamin A aldehyde.

Example 7

The reaction proceeds readily with other halogenated hydrocarbons such as the bromo- and iodo-compounds also. Thus 10 g. of 85% vitamin A 3,7-diol dimethyl acetal was dissolved in 20 ml. of ethyl iodide and heated at 120°–130° C. for 25 minutes to produce 9.77 g. of vitamin A aldehyde in a yield of 48.5%. Larger amounts of the halogenated hydrocarbon gives higher yields in most cases and are therefore preferred for optimum conversion as shown in the following example.

Example 8

A solution of 10 g. of 85% vitamin A 3,7-diol dimethyl acetal in 100 ml. of chloroform was heated at 100°–120° C. for 30 minutes and gave a yield of vitamin A aldehyde of 73.8%. Similar results are obtained with any of the other water-hydrolyzable halogenated hydrocarbons and particularly the halogenated alkanes. Since the nature of the acetal group does not affect the course of the reaction, any of the hydroxy vitamin A acetals can be converted to vitamin A aldehyde in accordance with the invention, the lower alkyl acetals being preferred for convenience. Likewise, the conversion proceeds readily with either the mono- or dihydroxy vitamin A acetals regardless of the chain position of the hydroxyl group or groups and the vitamin A 3,6-diol acetal, 3-hydroxy vitamin A acetal, 7-hydroxy vitamin A acetal and similar hydroxy vitamin A acetals can be converted in like manner.

Optimum results are obtained when the halogenated hydrocarbon also serves as the reaction medium, and it is thus preferred to employ such material as both reactant and solvent. The reaction is desirably effected at a temperature at or above the boiling point of the halogenated hydrocarbon in which case, of course, the halogenated hydrocarbon employed desirably has a boiling point below the decomposition temperature of the hydroxy vitamin A acetal. Large excesses of halogenated hydrocarbon can be and desirably are employed, the excess solvent being readily removed following conversion by evaporation or other means.

The invention thus provides a simple but effective method for converting hydroxy vitamin A acetals directly to vitamin A aldehyde in a single reaction step while minimizing the formation of unwanted $\beta,\gamma$-unsaturated isomers.

Although the invention has been described in detail with particular reference to certain preferred embodiments thereof, it will be understood that variations and modifications can be effected within the spirit and scope of the invention as described hereinabove and as defined in the appended claims.

I claim:

1. The method of converting hydroxy vitamin A acetal to vitamin A aldehyde in a single reaction step which comprises treating a hydroxy vitamin A acetal with a water-hydrolyzable halogenated aliphatic hydrocarbon at a temperature of 50–200° C. and thereby concomitantly dehydrating and hydrolyzing said hydroxy vitamin A acetal to vitamin A aldehyde.

2. The method of converting hydroxy vitamin A acetal to vitamin A aldehyde in a single reaction step which comprises heating at a temperature of 50–200° C. a mixture of hydroxy vitamin A acetal and a water-hydrolyzable halogenated lower aliphatic hydrocarbon in a homogeneous reaction system and thereby converting said hydroxy vitamin A acetal to vitamin A aldehyde.

3. The method which comprises heating at a temperature of 50–200° C. a solution of hydroxy vitamin A acetal in a water-hydrolyzable halogenated alkane containing insufficient water to form a two-phase system and thereby concomitantly dehydrating and hydrolyzing said hydroxy vitamin A acetal to vitamin A aldehyde.

4. The method which comprises heating a solution of vitamin A diol acetal in a water-hydrolyzable halogenated lower alkane at a temperature of 50–200° C. and thereby, in a single reaction step, converting said vitamin A diol acetal to vitamin A aldehyde.

5. The method which comprises heating at a temperature above about 100° C. and below about 180° C. a solution of vitamin A diol acetal in chloroform and thereby converting said vitamin A diol acetal to vitamin A aldehyde.

6. The method which comprises heating at a temperature above about 100° C. and below about 180° C., a solution of vitamin A diol acetal in carbon tetrachloride and thereby converting said vitamin A diol acetal to vitamin A aldehyde.

7. The method which comprises heating at a temperature of 50–200° C. a single phase reaction mixture of vitamin A 3,7-diol acetal dissolved in chloroform at an elevated temperature for a time sufficient to convert said vitamin A 3,7-diol acetal to vitamin A aldehyde.

8. The method which comprises heating at a temperature of 50–200° C. a single phase reaction mixture of vitamin A 3,7-diol acetal dissolved in carbon tetrachloride at an elevated temperature for a time sufficient to convert said vitamin A 3,7-diol acetal to vitamin A aldehyde.

9. The method of converting a hydroxy polyene acetal having the carbon skeleton of vitamin A but exhibiting substantially no vitamin A activity which comprises treating said hydroxy polyene acetal with a water-hydrolyzable halogenated lower alkane at a temperature of 50–200° C., and thereby converting a substantial portion of said hydroxy polyene acetal to an aldehydic compound exhibiting substantial vitamin A activity.

No references cited.